(12) United States Patent
Kerr, III

(10) Patent No.: US 6,602,597 B1
(45) Date of Patent: Aug. 5, 2003

(54) PRIMER FOR PHENYL-BASED SILICONE PRESSURE-SENSITIVE ADHESIVES

(75) Inventor: Stuart Robert Kerr, III, Troy, NY (US)

(73) Assignee: General Electric Company, Pittsfield, MA (US)

(*) Notice: Subject to any disclaimer, the term of this patent is extended or adjusted under 35 U.S.C. 154(b) by 1901 days.

(21) Appl. No.: 08/664,462

(22) Filed: Jun. 14, 1996

Related U.S. Application Data

(62) Division of application No. 07/817,266, filed on Jan. 3, 1992, now abandoned.

(51) Int. Cl.[7] ................................ C09J 7/02; B32B 7/12
(52) U.S. Cl. ................... 428/353; 428/354; 428/355 R; 427/208.4
(58) Field of Search .............................. 428/354, 355 R, 428/353; 427/208.4

(56) References Cited

PUBLICATIONS

GE Silicone Technical Information, CDS 1791, "Coating and Curing of Silgrip Silicone Pressure Sensitive Adhesives".

GE Silicones Product Dat,a, SS 4191, "Low Temperature, Fast Cure Paper Release Coating".

GE Silicones Technical Information, CDS 4086, "Testing of Silgrip Silicone Pressure Sensitive Adhesives".

GE Silicone Technical Data Book, S–46A, Silgrip Silicone Adhesives.

Adhesives Age, March, "Silicone PSA's: Types, Properties and Use" Duane F. Merrill.

*Primary Examiner*—Daniel Zirker
(74) *Attorney, Agent, or Firm*—Kenneth S. Wheelock

(57) ABSTRACT

Silicone primer compositions that provide excellent anchorage for phenyl-based silicone pressure sensitive adhesive prepared tape. The compositions comprise a phenyl-modified siloxane component such as a dimethyl-diphenyl siloxane component. The relative amount of phenyl substituents in the phenyl-modified primer matches the mole percent of phenyl substituents in the adhesive. One particular PSA system includes a primer composition and an adhesive which both contain a dimethyl, 5.3 mole percent diphenyl, silanol chain stopped silicone gum. Very thin layers of the primer are used between a substrate and a pressure sensitive adhesive. The primer compositions virtually eliminate all tendencies of phenyl-based silicone PSA prepared tape to delaminate.

22 Claims, 1 Drawing Sheet

PRIMER FOR PHENYL-BASED SILICONE PRESSURE-SENSITIVE ADHESIVES

This is a divisional of application Ser. No. 07/817,266 filed on Jan. 3, 1992, now abandoned.

FIELD OF THE INVENTION

The present invention relates to pressure sensitive adhesive tapes and, more particularly, to silicone compositions suitable for forming primer layers for pressure sensitive adhesives. The present invention further relates to a primer and adhesive system for a pressure sensitive adhesive tape wherein the primer and adhesive compositions each comprise a similar phenyl-modified silicone component.

BACKGROUND OF THE INVENTION

Silicone pressure-sensitive adhesives (PSA's) are primarily composed of a mixture of high molecular weight, silanol-functional organosiloxane polymers and silanol-functional polymer resins. These polymer/resin blends are often further batch-compounded in solvent solution by the catalyzed condensation reaction (in situ) of the silanol-functional reactants. Methyl-based silicone PSA's incorporate a polymer component based on repeated dimethyl siloxane building blocks. Phenyl-based silicone PSA's incorporate a polymer component based on a combination of both dimethyl siloxane and diphenyl siloxane building blocks. The presence of pendent phenyl functionality in the silicone polymer backbone increases both the higher temperature performance and the electrical resistance properties of the adhesive.

Silicone PSA's are used for coating high-temperature film substrate, also called base films, such as polyester, polyetherimide, polyimide, PTFE (polytetrafluoroethylene), and FEP (fluoroethylene propylene) in the preparation of high-performance industrial tapes. These tapes may be used for electrical insulation, electronic assembly masking, flame and plasma spray masking, EMI/RFI shielding, and splicing operations.

These processed tapes are self-wound, resulting in a number of dispensing issues for the tape manufacturer. Handling difficulties are created as a result of insufficient "anchorage" of the adhesive layer to the substrate film. When the tape is unwrapped during slitting operations or in automated dispensing operations, the adhesive may delaminate from the base film and transfer to the back-side of the wrapped tape, splitting the adhesive layer. This phenomenon is known as "legging". "Webbing" phenomena may also occur during slitting operations when the adhesive layer resists clean slitting, resulting in an adhesive "web" that promotes delamination off the base film along the slit-edges.

Both "legging" and "webbing" can be eliminated if the adhesive is sufficiently primer-bonded to the surface of the film substrate. A primer which has been previously applied to the surface of a film substrate acts as a tie-layer for securely anchoring the adhesive layer to the substrate.

Typically, the surface energy of a silicone PSA is extremely low, usually within the range of 20–26 mNm-1. This surface energy is in the same general range as traditional silicone release coatings which use this unique property for providing an easy-release surface for label stock. Organic-based (non-silicone) PSA's are high surface energy systems and consequently will not "wet out" onto lower energy surfaces, thus accounting for the ease-of-release characteristic. On the other hand, silicone PSA's do not readily release from a silicone release coating because their low surface energy allows them to "wet out" onto the surface of the release coat. It has been found that some silicone release coatings, such as those having a silanol gum with a dimethyl-siloxane polymer component, make excellent primers for most silicone PSA's in the preparation of high-performance industrial tape. Such silicone release coatings are widely used in industrial tapes for priming silicone PSA filmstock.

Although the technique of priming with primers comprising a dimethylsiloxane silanol gum has been a standard in the industry for many years, it has been found in practice to be only feasible for methyl-based silicone PSA's. However, these primers and other similar commercially available primers do not provide the anchorage necessary for phenyl-based silicone PSA's. A need therefore exists for an effective primer for phenyl-based PSA's.

SUMMARY OF THE INVENTION

The present invention relates to silicone primer compositions that provide excellent anchorage for phenyl-based silicone pressure sensitive adhesives used in the preparation of PSA tapes. The primer compositions comprise a silanol chainstopped phenyl-modified siloxane gum component, preferably a dimethyl-diphenyl siloxane gum component. The relative amount of phenyl substituents in the phenyl-modified silicone primer may vary depending upon the relative amount of phenyl substituents present in a pressure sensitive adhesive composition which is to be used in conjunction with the primer. More preferably, the amount of phenyl substituents in the primer matches the amount of phenyl substituents in the adhesive. Most preferably, the amount of phenyl substituents in the primer is within about ten percent of the amount of phenyl substituents in the adhesive.

According to one embodiment, the amount of phenyl substituents in each of the primer and adhesive is preferably between about 5.0 and about 5.5 mole percent. One particular primer and adhesive system in accordance with an embodiment of the present invention comprises a dimethyl, 5.3 mole percent diphenyl, silanol chainstopped silicone gum in both the primer and the adhesive.

Very thin layers of the primer are used between the adhesive composition and a supporting substrate. The primer compositions of the present invention, when used according to the present invention, virtually eliminate all tendencies of phenyl-based PSA prepared tape to delaminate.

DETAILED DESCRIPTION OF THE INVENTION

Figure 1:
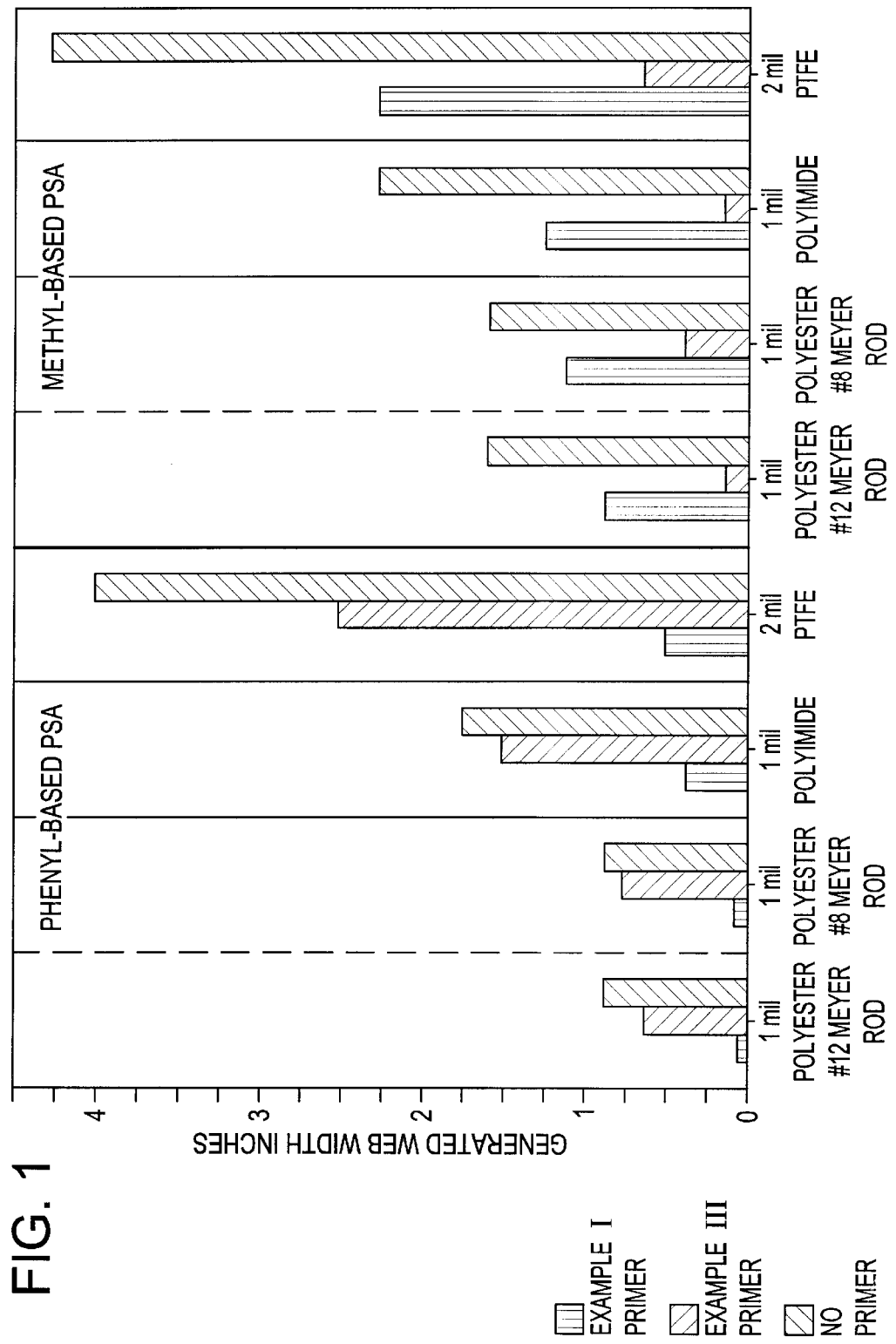
FIG. 1 is a graph showing the generated adhesive web width of various primed PSA's when subjected to a slit-edge web generation test.

The primer compositions of the present invention have been developed to be used for priming substrates surfaces so as to receive a phenyl-modified silicone pressure sensitive adhesive composition. According to an embodiment of the present invention the primer comprises a silanol chainstopped phenyl-modified siloxane gum which has a total phenyl substituent mole percentage which substantially matches the mole percentage of phenyl substituents in the adhesive. The phenyl-modified component of the primer is preferably the same as the phenyl-modified component of the adhesive. The relative amount of phenyl substituents in each of the primer and adhesive should also be the same although an amount in the primer which is within ten percent of the amount in the adhesive is still provides excellent results.

According to an embodiment superior adhesive tape systems can be developed from primer and adhesive compositions which each have a siloxane gum containing from about 5.0 to about 5.5 mole percent phenyl substituents. Gums having about five percent phenyl substituents are preferred. Gums having about 5.3 and 5.5 mole percent diphenyl substituents have proven to provide effective primer layers for phenyl based silicone PSA's.

The silanol end groups of the chains are cross-linked, after application to a substrate, by a tin-catalyzed silanol-hydride reaction. A tin catalyst may be provided in the dispersant of the primer composition to enable the silanol-hydride reaction. Cross-linking along the backbone of each chain is initiated by a peroxide initiator which becomes available from an adhesive composition applied to the primed substrate. Once the adhesive is applied to the primer layer, solvent and peroxide from the adhesive swells into the primer layer and initiates backbone cross-linking between the primer chains, between the adhesive chains, and between the primer and the adhesive to at least partially cross-link the primer layer to the adhesive layer.

The phenyl substituents on the polysiloxane backbone may be methyl/phenyl or diphenyl groups. The silicone gums usually also contain dimethyl substituent groups. The siloxane component preferably comprises a silanol chain-stopped silicone gum having a molecular weight range of from about 300,000 to about 600,000. The resin/gum silicone PSA composition typically has a viscosity of about 50,000 to about 100,000 cps when present in a solution of about 55 percent solids in xylene.

The primer compositions according to an embodiment of the present invention further contain a cross-linker dispersed in an appropriate solvent. The primer compositions are dispersed in a solvent to facilitate thin coating. One particularly useful solvent is a 50/50 blend of toluene and hexane, although other solvents may be used. The amount of cross-linker may vary but is preferably about four percent the weight of the gum.

In accordance with a preferred embodiment of the present invention, and in previous primer application techniques, a very thin layer of primer is coated onto a tape substrate, such as a sheet of polyester, polyimide or polytetrafluoroethylene having a thickness of about one to about seven mils. Generally, polyester and polyimide films are used at a thickness of about one to about two mils whereas PTFE substrates are used at a thickness of about two to about seven mils.

The primer compositions of the present invention may be coated, i.e., applied over supporting film substrates by various methods; however, application with a #8 or #12 meyer rod has proven to be a simple method for providing a uniform thin layer. The primer layer should preferably be applied at a coverage of about 0.2 to about 0.5 pounds per ream. The coverage may vary due to the specific primer composition but is most preferably about 0.3 pounds per ream for a primer composition having a phenyl-modified siloxane component with about five mole percent phenyl substituents. Thinner layers tend to adhere better to substrates due to an unexplained phenomena which most likely results from Van der Waals, dipole, induced dipole, hydrogen bonding or other intramolecular forces.

After application to the substrate,, the primer completes cross-linking at its silanol functional end groups in the presence of a tin catalyst. A prepared pressure sensitive adhesive is then applied to the primer coated substrate and cured. Tapes prepared in this manner and incorporating the phenyl based primers of the present invention virtually eliminate the tendency of the tapes to delaminate.

It is believed that due to the interfacial compatibilities between the phenyl-based silicone primer of the present invention and the phenyl-based silicone PSA compositions to be used in conjunction therewith, very strong bonds between the adhesive compositions and supporting substrates can be obtained. This is even more pronounced when the amount of phenyl substituents in each is closely matched.

Table I shows the component compositions for two experimental primer compositions in accordance with embodiments of the present invention and for a standard methyl-based dimethyl siloxane gum primer. Composition I incorporates 0.5% less methyl hydrogen fluid cross-linker then does Composition II or the Standard. As used herein "meyer rod" or "Meyer rod" refers to a wire-wound wet film applicator rod. The "#8" or "#12" used in conjunction with this term designates the wire size of the wire wound around the rod. Generally the larger the wire size, the thicker the film that is applies. #8 wire has a diameter of 0.008 inches. #12 wire has a diameter of 0.012 inches.

TABLE I

PRIMER COMPOSITIONS

| Components, parts by weight | PRIMERS | | |
|---|---|---|---|
| | I | II | Standard |
| dimethyl, 5.3 mole percent diphenyl, silanol chain stopped silicone gum | 29.25 | 29.25 | — |
| dimethyl silanol chain-stopped silicone gum | — | — | 29.25 |
| methyl hydrogen fluid cross-linker | 1.25 | 1.75 | 1.75 |
| 50/50 blend toluene/hexane solvent | 69.50 | 69.00 | 69.00 |

The invention may be more fully understood with reference to the examples set forth below.

EXAMPLE I 0.66 gram of a 50% toluene solution of dibutyl tin diacetate and 0.66 gram of a cure accelerator comprising a 50% toluene solution of methyl-2-dimethyl amino ethoxy-polysiloxane chainstopped with trimethylsiloxy groups was added to 13.3 grams of Composition I. This activated mixture was then diluted with 85.38 grams of a 50/50 blend of toluene and hexane solvents. The primer was coated and cured onto a variety of high-temperature film substrates. (See Table II)

EXAMPLE II 0.66 gram of a 50% toluene solution of dibutyl tin diacetate and 0.66 gram of a cure accelerator comprising a 50% toluene solution of methyl-2-dimethyl amino ethoxy-polysiloxane chainstopped with trimethylsiloxy groups was added to 13.3 grams of Composition II. This activated mixture was then diluted with 85.38 grams of a 50/50 blend of toluene and hexane solvents. The primer was coated and cured onto a variety of high-temperature film substrates. (See Table II)

EXAMPLE III 0.66 gram of a 50% toluene solution of dibutyl tin diacetate and 0.66 gram of a cure accelerator comprising a 50% toluene solution of methyl-2-dimethyl amino ethoxypolysiloxane chainstopped with trimethylsiloxy groups was added to 13.3 grams of the standard methyl-based polymer. This activated mixture was then diluted with 85.38 grams of a 50/50 blend of toluene and hexane solvents. The primer was coated and cured onto a variety of high-temperature film substrates. (See Table II)

TABLE II

PRIMED FILM PREPARATIONS
All Samples Were Cured 20 sec. @ 265°F.
PRIMER PARAMETERS

| Sample Preparation | Primer | Film Substrate | Meyer Rod Number |
| --- | --- | --- | --- |
| 1 | Example I | 1-mil Polyester | 12 |
| 2 | Example I | 1-mil Polyester | 8 |
| 3 | Example I | 1-mil Polyimide | 12 |
| 4 | Example I | 2-mil PTFE | 12 |
| 5 | Example II | 1-mil Polyester | 12 |
| 6 | Example II | 1-mil Polyimide | 12 |
| 7 | Example II | 2-mil PTFE | 12 |
| 8 | Example III | 1-mil Polyester | 12 |
| 9 | Example III | 1-mil Polyimide | 12 |
| 10 | Example III | 2-mil PTFE | 12 |

The three primer formulations prepared according to Examples I–III were coated and cured into polyester, polyimide and PTFE films as delineated in Table II. Two different Meyer rods were employed for applying sample preparations 1 and 2. It is estimated that use of the #8 Meyer rod achieves a coating weight of 0.3 lbs/ream while use of the #12 Meyer rod achieves an estimated coating weight of 0.6 lbs/ream—these estimates being provided for approx. 4.5% primer solutions onto 1-mil polyimide film.

Two peroxide catalyzed silicon PSA solutions were prepared. The first was a phenyl-based silicone PSA having a resin to gum ratio of about 53 to 47. The resin was a polytrimethyl hydrosilyl silicate MQ siloxane resin having a molecular weight of between about 1500 and 2000. The gum was a dimethyl, 5.3 mole percent diphenyl, polyorganosiloxane silicone gum having a molecular weight of about 500,000. The silicone PSA solution had a viscosity of about 75,000 cps as a solution at 55 percent solids in xylene. The second PSA silicone solution was a methyl-based resin/gum silicone PSA having a resin to gum ratio of about 57 to 43. The resin was a polytrimethyl hydrosilyl silicate MQ siloxane resin having a molecular weight of between about 1500 and 2000. The gum was a dimethyl substituted polyorganosiloxane gum having a molecular weight of about 500,000. The silicone PSA solution had a viscosity of about 90,000 cps as a solution at 60 percent solids in toluene.

Each PSA was catalyzed with 2.0% benzoyl peroxide relative to the solids weight. These prepared PSA's were coated onto the primed and unprimed polyester, polyimide and PTFE films to achieve a 1.5-mil dry adhesive coating thickness. Each coated sample was cured for 90 seconds @ 95° C. (solvent flash), followed by 2 minutes @ 165° C. (peroxide cure).

Cured silicone PSA tape samples were then evaluated for anchorage by initiating a slit in the tape and then propagating a tear along its length. The width of the generated adhesive "web" was then visually calculated using an inch-scale ruler. A poorly anchored pressure sensitive adhesive tape will generate a wide adhesive layer web due to adhesive delamination along the slit-edges. This delamination will feed the growing web helping it to resist tearing. Web generation widths of ½ inch or less indicate acceptable anchorage. Web generation widths of less than ⅛ inch are most desirable. Web generation widths of more than ½ inch are generally unacceptable for most applications. The success of anchorage is determined by the ability of the primer to prevent slit-edge delamination and thus its effectiveness in eliminating web generation. Table III summarizes the results of this testing by relating generated web width to primer preparation.

TABLE III

SLIT-EDGE "WEB" GENERATION

| Silicone | Film | Meyer Rod | Ex. I | Ex. II | Ex. III | No Primer |
| --- | --- | --- | --- | --- | --- | --- |
| phenyl-based PSA | polyester | 12 | 1/64 | 1/32 | 5/8 | 7/8 |
| phenyl-based PSA | polyester | 8 | 1/16 | — | 3/4 | 7/8 |
| phenyl-based PSA | polyimide | 12 | 3/8 | — | 1 ½ | 1 ¾ |
| phenyl-based PSA | PTFE | 12 | ½ | — | 2 ½ | 4 |
| methyl-based PSA | polyester | 12 | 7/8 | — | ⅛ | 1 ½ |
| methyl-based PSA | polyester | 8 | 1 ⅛ | — | 3/8 | 1 ½ |
| methyl-based PSA | polyimide | 12 | 1 ¼ | — | ⅛ | 2 ¼ |
| methyl-based PSA | PTFE | 12 | 2 ¼ | — | 5/8 | 4 ¼ |

The slit-edge "web" generation data presented in Table III illustrates the primer performance of the primers in accordance with the present invention in the secure anchoring of phenyl-based silicone PSA's to different industrial tape film substrates. The primers are specific in use for the phenyl-based PSA's whereas the methyl-based primer is specific for its use with methyl-based silicone PSA's. FIG. 1 further illustrates this specificity in use. Of the tested primer/adhesive combinations, the more thickly applied primers as prepared by #12 Meyer rod show improvement in anchorage when compared to #8 Meyer rod prepared samples.

FIG. 1 highlights primer results for Example I because this variant displayed a useful, workable life after being catalyzed, "bath life", similar to the standard shown in Example III. The composition of Example II did not perform quite so well as that of Example I, and its bath life was shorter. The difficulty in processability of the Example II primer was probably due to the instability resulting from the excess cross-linker and thus the higher rate and degree of cross-linking.

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed is:

1. A pressure sensitive adhesive tape comprising a substrate, a cured primer composition coated onto said substrate in the form of a primer layer, and a pressure sensitive adhesive layer coated onto said cured primer composition, said cured primer composition comprising a cross-linked phenyl-substituted siloxane gum, said pressure sensitive adhesive layer comprising a high molecular weight phenyl-substituted, silanol-functional organosiloxane polymer and a silanol-functional resin, said adhesive layer being at least partially cross-linked to said primer layer and securely anchored to said substrate.

2. A pressure sensitive adhesive tape according to claim 1, wherein said phenyl-substituted siloxane gum of said primer composition and said phenyl substituted silanol-functional organosiloxane polymer of said adhesive comprise diphenyl functional groups.

3. A pressure sensitive adhesive tape according to claim 2, wherein the total mole percent of phenyl substituents in each of said siloxane gum of said primer composition and said phenyl substituted silanol-functional organosiloxane polymer of said adhesive is between about 5.0 and about 5.5 mole percent.

4. A pressure sensitive adhesive tape according to claim 1, wherein said phenyl-substituted siloxane gum of said primer composition and said phenyl substituted silanol-functional organosiloxane polymer of said adhesive comprise diphenyl functional groups and dimethyl functional groups.

5. A pressure sensitive adhesive tape according to claim 4, wherein the total mole percent of phenyl substituents in each of said siloxane gum of said primer composition and said phenyl substituted silanol-functional organosiloxane polymer of said adhesive is between about 5.0 and about 5.5 mole percent.

6. A pressure sensitive adhesive tape according to claim 1, wherein said substrate comprises at least one member selected from the group consisting of polyester, polyimide and polytetrafluoroethylene.

7. A pressure sensitive adhesive tape according to claim 1, wherein said substrate has a thickness of between about one and two mils an said primer layer is applied to said substrate at a coverage of between about 0.2 and about 0.5 pounds per ream.

8. A pressure sensitive adhesive tape according to claim 1, wherein said cross-linking agent comprises methyl hydrogen fluid.

9. A pressure sensitive adhesive tape according to claim 8, wherein said cross-linking agent is present in an amount of about four percent by weight relative to the weight of the phenyl-substituted siloxane gum of said primer composition.

10. A pressure sensitive adhesive tape according to claim 1, wherein said siloxane gum of said primer composition has a molecular weight in the range of about 300,000 to about 600,000.

11. A pressure sensitive tape according to claim 1, wherein siloxane gum of said primer composition has a total mole percent of phenyl substituents which is within ten percent the total mole percent of phenyl substituents in said phenyl substituted silanol-functional organosiloxane polymer of said adhesive.

12. A method of securely anchoring a phenyl-based pressure sensitive adhesive composition to a substrate, said method comprising:

applying a primer composition to said substrate to form a primer layer on said substrate, said primer comprising a phenyl substituted siloxane gum and a cross-linking agent, dispersed in a solvent therefor;

curing said primer composition with a catalyst to form a cured primer layer on said substrate;

applying a phenyl-based pressure sensitive adhesive composition comprising a phenyl substituted silanol-functional organosiloxane polymer and a silanol-functional MQ resin, to said cured primer layer; and curing said phenyl-based pressure sensitive adhesive so as to cross-link said adhesive to said cured primer layer.

13. A method according to claim 12, wherein said phenyl-substituted siloxane gum of said primer composition and said phenyl substituted silanol-functional organosiloxane polymer of said adhesive comprise diphenyl functional groups.

14. A method according to claim 13, wherein the total mole percent of phenyl substituents in each of said siloxane gum of said primer and said phenyl substituted silanol-functional organosiloxane polymer of said adhesive is between about 5.0 and about 5.5 mole percent.

15. A method according to claim 12, wherein said phenyl-substituted siloxane gum of said primer composition and said phenyl substituted silanol-functional organosiloxane polymer of said adhesive comprise diphenyl functional groups and dimethyl functional groups.

16. A method according to claim 15, wherein the total mole percent of phenyl substituents in each of said siloxane gum of said primer composition and said phenyl substituted silanol-functional organosiloxane polymer of said adhesive is between about 5.0 and about 5.5 mole percent.

17. A method according to claim 12, wherein said primer composition is applied at a coverage of between about 0.2 and about 0.5 pounds per ream.

18. A method according to claim 17, wherein said primer composition is applied to said substrate with a #12 Meyer rod.

19. A method according to claim 17, wherein said primer composition is applied to said substrate with a #8 Meyer rod.

20. A method according to claim 12, wherein said phenyl-based pressure sensitive adhesive is cured by a solvent flash technique followed by a peroxide cure.

21. A method according to claim 12, wherein said siloxane gum of said primer composition has a total mole percent of phenyl substituents which is within ten percent the total mole percent of phenyl substituents in said phenyl substituted silanol-functional organosiloxane polymer of said adhesive.

22. A method according to claim 12, wherein said catalyst is a tin catalyst.

* * * * *